(12) United States Patent
Yie et al.

(10) Patent No.: US 9,241,340 B2
(45) Date of Patent: Jan. 19, 2016

(54) APPARATUS FOR SCHEDULING IN LTE MACHINE TYPE COMMUNICATION

(71) Applicant: Humax Holdings Co., Ltd., Yongin-si, Gyeonggi-do (KR)

(72) Inventors: Alex Chungku Yie, Incheon (KR); Yongjae Lee, Seongnam-si (KR); Jun Bae Ahn, Gwangju-si (KR)

(73) Assignee: HUMAX HOLDINGS CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 14/603,042

(22) Filed: Jan. 22, 2015

(65) Prior Publication Data
US 2015/0208434 A1    Jul. 23, 2015

(30) Foreign Application Priority Data

| Jan. 23, 2014 | (KR) | 10-2014-0008371 |
| May 16, 2014 | (KR) | 10-2014-0058952 |
| May 16, 2014 | (KR) | 10-2014-0058953 |
| May 16, 2014 | (KR) | 10-2014-0058954 |
| Jul. 14, 2014 | (KR) | 10-2014-0088518 |
| Jan. 22, 2015 | (KR) | 10-2015-0010869 |

(51) Int. Cl.
*H04W 4/00* (2009.01)
*H04W 72/12* (2009.01)

(52) U.S. Cl.
CPC .......... *H04W 72/1242* (2013.01); *H04W 4/005* (2013.01)

(58) Field of Classification Search
CPC . H04W 74/004; H04W 74/008; H04W 4/005; H04B 7/0808
See application file for complete search history.

(56) References Cited

U.S. PATENT DOCUMENTS

| 8,737,305 B2* | 5/2014 | Cho et al. ........................ 370/328 |
| 8,743,682 B2* | 6/2014 | Lee et al. ........................ 370/229 |
| 8,750,189 B2* | 6/2014 | Choi et al. ...................... 370/311 |
| 8,774,849 B2* | 7/2014 | Cho et al. ........................ 455/515 |
| 8,842,538 B2* | 9/2014 | Liao ................................. 370/235 |
| 8,964,658 B2* | 2/2015 | Chen et al. ...................... 370/329 |
| 9,001,946 B2* | 4/2015 | Lee et al. ........................ 375/347 |

FOREIGN PATENT DOCUMENTS

KR    10-2011-0072478 A    6/2011

* cited by examiner

*Primary Examiner* — Melanie Jagannathan
(74) *Attorney, Agent, or Firm* — Hauptman Ham, LLP

(57) ABSTRACT

The present invention relates to a way that a machine type communication module transmits/receives data, using a sleep mode or avoiding a busy time of a base station. That is, the present invention relates to an apparatus for scheduling in LTE machine type communication in which a machine type communication module transmits/receives data, using a sleep mode or avoiding a busy time of a base station for a response to an order or for a periodic report. The apparatus for scheduling in LTE machine type communication includes a machine type communication module that performs machine type communication with a base station.

6 Claims, 7 Drawing Sheets

FIG. 5
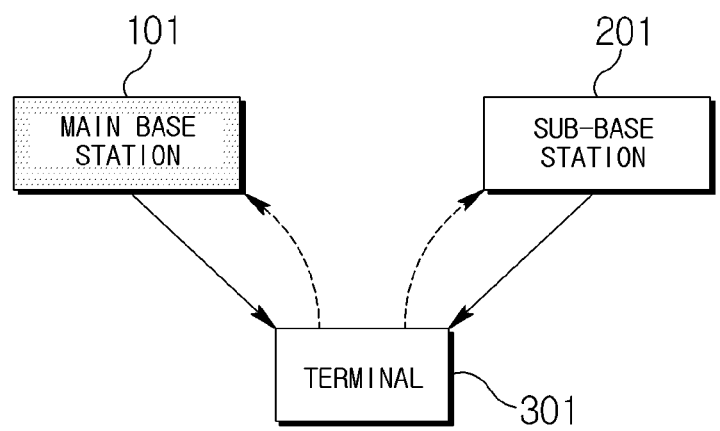
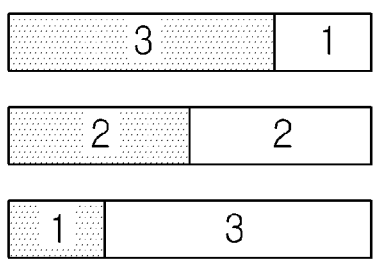

FIG. 7
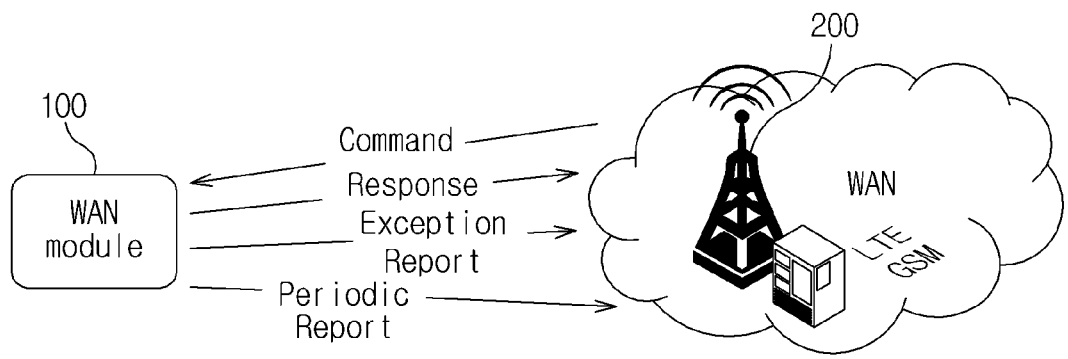
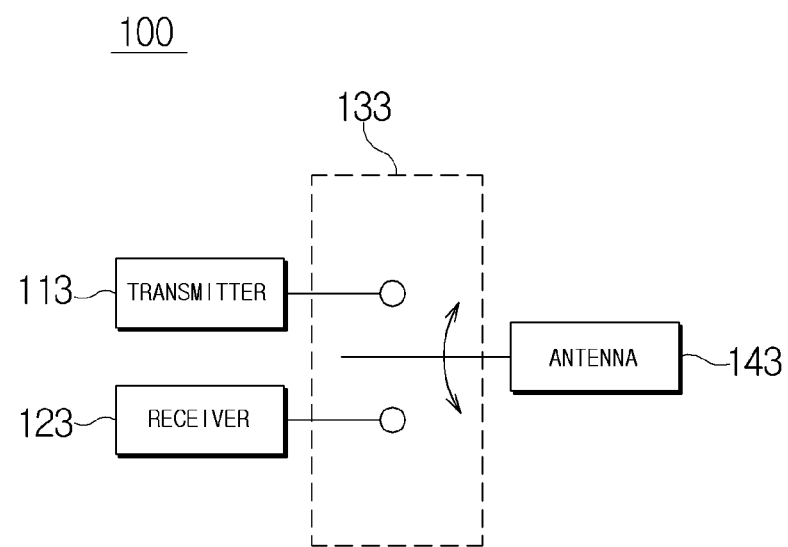
FIG. 8

APPARATUS FOR SCHEDULING IN LTE MACHINE TYPE COMMUNICATION

BACKGROUND OF THE INVENTION

1. Field of the Invention

Exemplary embodiments of the present invention relate to an apparatus for scheduling in LTE machine type communication, and particularly, to a configuration in which a machine type communication terminal transmits/receives data, using a sleep mode or avoiding a busy time of a base station. That is, exemplary embodiments of the present invention relate to an apparatus for scheduling in LTE machine type communication in which a machine type communication terminal transmits/receives data, using a sleep mode or avoiding a busy time of a base station for a response to an order or for a periodic report.

2. Description of the Related Art

Machine-to-machine communication known as MTC (Machine Type Communication) uses a plurality of wireless communication units such as a 3G/4G communication network including a WLAN and LTE for a wireless terminal and provides an information service on a mobile wireless terminal from a service server through the wireless communication units.

In the MTC, a person is not necessary, there are a large number of latent terminals communicating with a server, and less traffic is used for each of the terminals. For example, the MTC may be used for remote measurement and control and e-health. In the MTC, many MTC terminals communicate with each other using limited radio resources, so there is a large possibility of interference or loss of data between a server and the MTC terminals.

Therefore, there is a need of scheduling for efficiently using limited radio resources and preventing loss of data due to interference, when traffic to/from many MTC terminals is generated.

DOCUMENTS OF RELATED ART

Patent Document

Korean Patent Application Publication No. 10-2011-0072478 (Jun. 19, 2011)

SUMMARY OF THE INVENTION

An object of the present invention is to provide an apparatus for scheduling in LTE machine type communication in which a machine type communication terminal transmits/receives data, using a sleep mode or avoiding a busy time of a base station.

Another object of the present invention is to provide an apparatus for scheduling in LTE machine type communication in which a machine type communication terminal transmits/receives data, using a sleep mode or avoiding a busy time of a base station for a response to an order or for a periodic report, thereby saving a battery of the machine type communication terminal and efficiently using a radio resource of a base station.

In accordance with an aspect of the present invention, a system for scheduling in LTE machine type communication includes: a main base station that allocates a radio resource to a terminal and performs data communication with the terminal; a sub-base station that performs data communication with the terminal simultaneously with the main base station; and a terminal that sets the ratio of an upper limit of power to be transmitted to the main base station and the sub-base station on the basis of statistic analysis on power transmitted to the main base station and the sub-base station.

The terminal performs statistic analysis by analyzing a transmission power ratio on the basis of the average power transmitted to the main base station and the sub-base station.

The terminal reports the ratio of an upper limit of transmission power to the main base station and the sub-base station.

The terminal allocates power to the main base station first and then distributes the remaining power to the sub-base station.

The terminal may not simultaneously perform changing power distribution and changing a MCS (Modulation and Coding Scheme) value.

The terminal sets the period for reporting a CQI (Channel Quality Indicator) for changing the MCS not to overlap the power distribution.

In accordance with another aspect of the present invention, a system for scheduling in LTE machine type communication includes: a main base station that allocates a radio resource to a terminal and performs data communication with the terminal; a sub-base station that performs data communication with the terminal simultaneously with the main base station; and a terminal that transmits at least any one of random access by triggering or self random access without triggering to the main base station and the sub-base station, to at least any one of the main base station and the sub-base station.

The terminal performs triggering in response to a triggering order from any one of a PDCCH, a MAC, and an RRC.

The sub-base station includes a base station that can be accessed first in base stations that can operate as sub-base stations.

The random access is transmitted in any one type of a preamble without contents, initial access, a radio resource control message, and a terminal ID.

Further, the terminal transmits random access, using the remaining power except for the power distributed to an uplink.

The terminal performs random access additionally using a random time around ten seconds, when the main base station or the sub-base station is newly turned on.

The terminal performs random access to the main base station or the sub-base station by finding out the transmission position of the main base station or the sub-base station, using a multi-antenna.

The terminal performs random access by sweeping at 360 degrees with a multi-antenna to the main base station or the sub-base station.

In accordance with another aspect of the present invention, an apparatus for scheduling in LTE machine type communication includes a machine type communication module that performs machine type communication with a base station.

The machine type communication module may include: a transmitter that transmits data to the base station; a receiver that receives data from the base station; an antenna that is matched with the base station at an RF; and a switch that switches and connects the transmitter and the receiver with the antenna.

The machine type communication module may intermittently receive data from the base station by operating in a sleep mode.

The machine type communication module may transmit/receive data, avoiding a busy time of the base station.

The machine type communication module may stop transmission when receiving a message saying the busy time by scheduling of the base station, and the machine type communication module may retransmit a message when the busy time has passed.

The machine type communication module may transmit a report of an event even at the busy time of the base station, depending on the importance of the report.

According to the apparatus for scheduling in LTE machine type communication, a machine type communication terminal can transmit/receives data, using a sleep mode or avoiding a busy time of a base station.

According to the apparatus for scheduling in LTE machine type communication, a machine type communication terminal can transmit data, using a sleep mode or avoiding a busy time of a base station for a response to an order or for a periodic report, thereby saving a battery of the machine type communication terminal and efficiently using a radio resource of a base station.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a diagram illustrating a configuration in detail when transmission power for a terminal is allocated to the main base station or the sub-base station of FIGS. 2 and 3;

FIG. 7 is a diagram illustrating the configuration of LTE machine type communication according to another exemplary embodiment of the present invention;

FIG. 8 is a diagram illustrating the configuration of an apparatus for scheduling in LTE machine type communication according to the present invention;

DESCRIPTION OF SPECIFIC EMBODIMENTS

Figure 1:
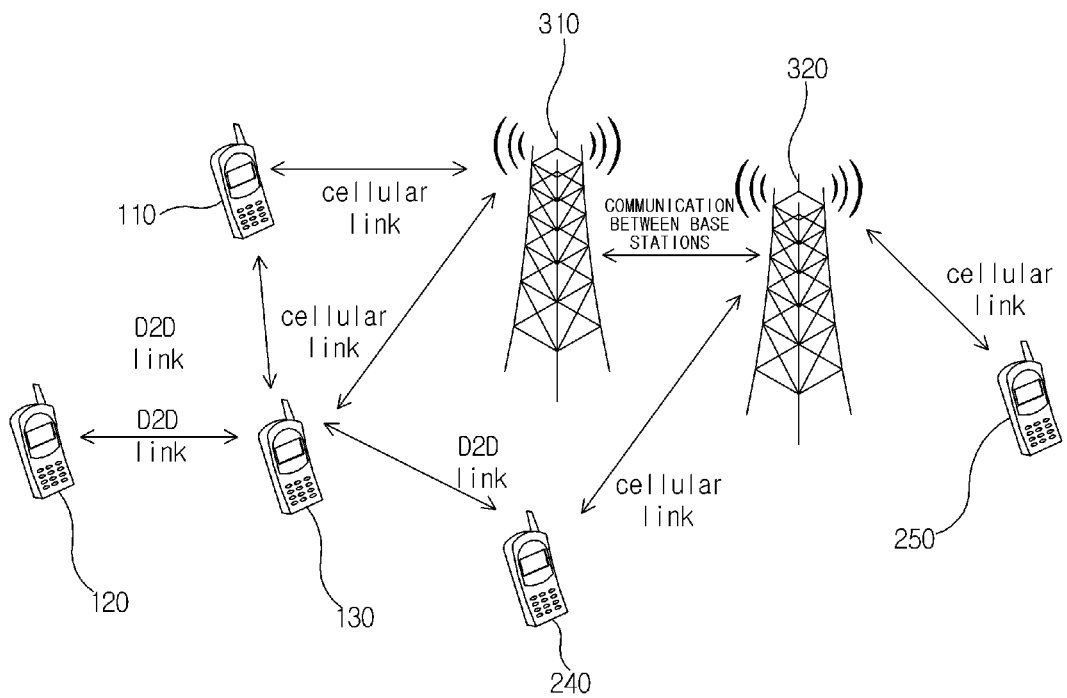
FIG. 1 is a diagram illustrating the configuration of an LTE network according to an exemplary embodiment of the present invention.

Detailed exemplary embodiments of the present invention will be described with reference to the accompanying drawings.

The present invention may be modified in various ways and implemented by various exemplary embodiments, so that specific exemplary embodiments are illustrated in the drawings and will be described in detail below. However, it is to be understood that the present invention is not limited to the specific exemplary embodiments, but includes all modifications, equivalents, and substitutions included in the spirit and the scope of the present invention.

Hereinafter, an apparatus for scheduling in LTE machine type communication according to the present invention is described in detail with reference to the accompanying drawings.

FIG. 1 is a diagram illustrating the configuration of an LTE network according to an exemplary embodiment of the present invention and FIGS. 2 to 6 are diagrams illustrating the configuration of FIG. 1 in detail.

A system for reassembling an apparatus for scheduling in LTE machine type communication according to an exemplary embodiment of the present invention is described hereafter with reference to FIGS. 1 to 6.

Referring to FIG. 1 first, an LTE network structure according to an exemplary embodiment of the present invention is composed of base stations and terminals. In particular, new frequencies can be allocated and used for device-to-device communication, when a macrocell and a D2D channel are specifically allocated.

When a macrocell and a D2D channel are both allocated, device-to-device communication may be achieved by at least any one of adding a sub-channel and using the physical channel used by the macrocell, and at least any one of a channel allocation scheme, a channel management scheme, and a duplexing method may be used for interference between the macrocell and the D2D channel.

Further, synchronization between terminals may be provided from at least any one of an uplink, a downlink, and both of an uplink and a downlink.

In the LTE network structure, in detail, a first terminal 110 and a third terminal 130 are in the cellular link coverage of a first base station 310, and a fourth terminal 240 and a fifth terminal 250 are in the cellular link coverage of a second base station 320.

The third terminal 130 is positioned at a distance where D2D communication with the first terminal 110, the second terminal 120, and the fourth terminal 240 is available. The D2D link of the third terminal 130 and the first terminal 110 is in the same first base station 310, the D2D link of the third terminal 130 and the fourth terminal 240 is on another cellular coverage, the D2D link of the third terminal 130 and the second terminal 120 is formed by the second terminal 120 not positioned in any cellular coverage and the third terminal 130 positioned in the cellular coverage of the first base station 310.

The cellular link channel used between the first base station 310 and the third terminal 130 and the D2D link channel used by the third terminal 130 and the fourth terminal 240 may be separately or simultaneously allocated.

For example, when the cellular link channel used between the first base station 310 and the third terminal 130 and the D2D link channel used by the third terminal 130 and the fourth terminal 240 use the same frequency, OFDM symbols of PDSCH, PDCCH, PUSCH, and PUCCH may be separately allocated.

In particular, the first base station 310 can carry out an allocation schedule of time slots for transmitting a synchronization signal, a discovery signal, and an HARQ for the D2D link channel used by the third terminal 130 and the fourth terminal 240.

The synchronization signal transmitted by the first base station 310 may be used simultaneously with the information about the cellular link of the first base station 310, but the time slots for transmitting a synchronization signal, a discovery signal, and an HARQ for the third terminal 130 and the fourth terminal 240 may be scheduled not to overlap the time slots of the cellular link channels used between the first base station 310 and the third terminal 130.

When the cellular link channel used between the first base station 310 and the third terminal 130 and the D2D link channel used by the third terminal 130 and the fourth terminal 240 use different frequencies, the third terminal 130 and the fourth terminal 240 can exclusively use the OFDM symbols of PDSCH, PDCCH, PUSCH, and PUCCH, and the third terminal 130 or the fourth terminal 240 can perform scheduling.

D2D communication between the third terminal 130 and the fourth terminal 240 is performed, avoiding interference influenced by the first base station 310 and the first terminal 110. In particular, in the D2D communication between the third terminal 130 and the fourth terminal 240, the third terminal 130 uses any one of a way of transmitting a synchronization signal received from the first base station 310 to the fourth terminal 240 through the uplink channel used by the first base station 310, a way of transmitting the synchronization signal to the fourth terminal 240 through the downlink channel used by the first base station 310, and a way of transmitting the synchronization signal to the fourth terminal 240 through both of the uplink and downlink channels used by the first base station 310.

Figure 2:
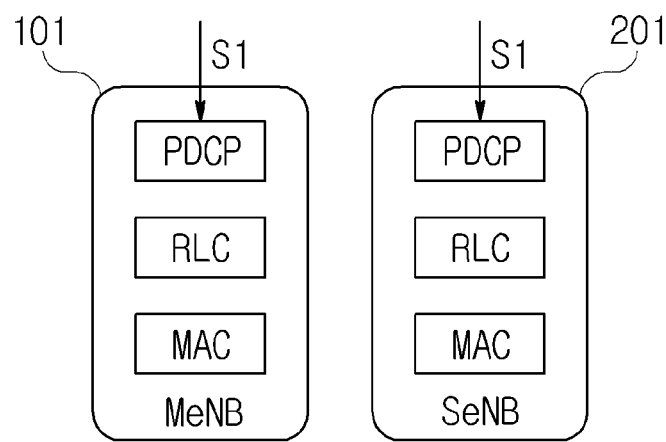
FIG. 2 is a diagram illustrating the configuration of dual connectivity when a first base station of FIG. 1 operates as a main base station and a second base station operates independently as a sub-base station.

FIG. 2 is a diagram illustrating a configuration of dual connectivity when the first base station 310 of FIG. 1 operates as a main base station 101 and the second base station 320 operates independently as a sub-base station 201.

The main base station 101 (master eNB) and the sub-base station 201 (secondary eNB), which are used for dual connectivity, are individually connected with a core network.

Accordingly, all of protocols are independent from the main base station 101 and the sub-base station 201, and particularly, data to be transmitted to two base stations is not separated and combined at the base stations.

A PDCP (Packet Data Convergence Protocol) is one of wireless traffic protocol stacks in LTE which compresses and decompresses an IP header, transmits user data, and keeps a sequence number for a radio bearer.

RLC (Radio Link Control) is a protocol stack of controlling wireless connection between a PDCP and MAC.

MAC (Media Access Control) is a protocol stack supporting multi access on a wireless channel.

Figure 3:
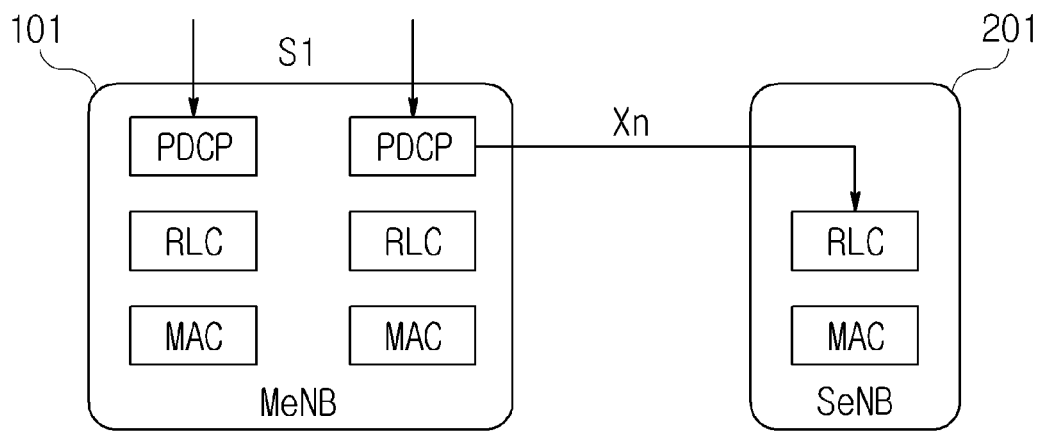
FIG. 3 is a diagram illustrating the configuration of dual connectivity when the first base station of FIG. 1 operates as a main base station, the second base station operates as a sub-base station, and data is separated and combined through the main base station.

FIG. 3 is a diagram illustrating a configuration of dual connectivity when the first base station 310 of FIG. 1 operates as a main base station 101, the second base station 320 operates as a sub-base station 201, and data is separated and combined through the main base station 101.

That is, when the main base station 101 and the sub-base station 201, which are used for dual connectivity, are connected with a core network, only the main base station 101 is connected with the core network and the sub-base station 201 is connected with the core network through the main base station 101.

Accordingly, data transmitted/received on the core network is separated and combined by the main base station 101. That is, data separated from the main base station 101 is transmitted to the sub-base station 201 or data received from the sub-base station 201 is combined and transmitted/received on the core network.

Figure 4:
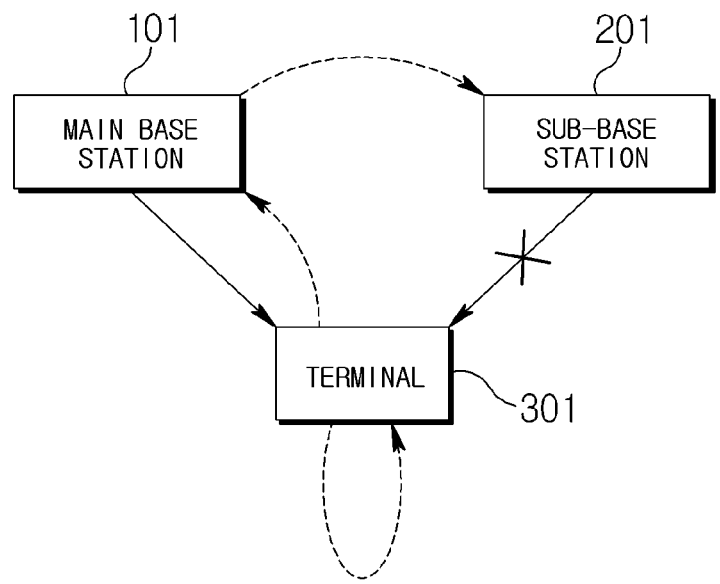
FIG. 4 is a diagram illustrating a configuration in detail when the sub-base station of FIGS. 2 and 3 is disconnected from a terminal.

FIG. 4 is a diagram illustrating a configuration in detail when the sub-base station 201 of FIGS. 2 and 3 is disconnected from a terminal 301.

That is, the system for scheduling in LTE machine type communication includes the main base station 101 that allocates a radio resource to the terminal 301 and performs data communication with the terminal 301, the sub-base station 201 that performs data communication with the terminal 301 simultaneously with the main base station 101, and the terminal 301 that simultaneously performs data communication with the main base station 101 and the sub-base station 201, and resets radio resource control when it unlinks from the sub-base station 201.

When the terminal 301 is not normally connected with the sub-base station 201, it informs the main base station 101 of connection state information and the main base station 101 informs the sub-base station 201 of the link state information between the sub-base station 201 and the terminal 301.

Similarly, when the terminal 301 is abnormally connected with the main base station 101, the terminal 301 resets radio resource control and reports it to the sub-base station 201 and the sub-base station 201 reports the abnormal connection to the main base station 101.

The communication between the main base station 101 and the sub-base station 201 may be performed by adding information to a frame in an X2 interface or by a broadband network, and when they are not connected by a wire, wireless backhaul may be used for the communication. A signal system including a link state header showing the link state of the main base station 101 and the sub-base station 201, a link state, a base station ID, and a terminal ID may be used for the information in the frame.

Accordingly, when there is a problem with connection in any one of the main base station 101 and the sub-base station 201, the terminal 301 reports it to any one of the main base station 101 and the sub-base station 201, which has no problem, and the base station receiving the report informs the base station with the problem with connection of the report so that the state of connection with the terminal 301 can be checked.

On the other hand, when there is a problem with connection in both of the main base station 101 and the sub-base station 201, similarly, the terminal 301 resets the radio resource control to allow for communication with the base stations.

FIG. 5 is a diagram illustrating a configuration in detail when transmission power for the terminal 301 is allocated to the main base station 101 or the sub-base station 201 of FIGS. 2 and 3.

That is, the system for scheduling in LTE machine type communication includes the main base station 101 that allocates a radio resource to the terminal 301 and performs data communication with the terminal 301, the sub-base station 201 that performs data communication with the terminal 301 simultaneously with the main base station 101, and the terminal 301 that sets an upper limit ratio of transmission power for the main base station 101 and the sub-base station 201 on the basis of statistic analysis on power sent out from the main base station 101 and the sub-base station 201.

The statistic analysis is analyzing a transmission power ratio on the basis of the average power sent out from the terminal 301 to the main base station 101 and the sub-base station 201, and the terminal 301 reports the upper limit ratio of transmission power to the main base station 101 and the sub-base station 201.

That is, the terminal 301 sets the power ratio to send out to the main base station 101 and the sub-base station 201 on the basis of the average value of the maximum power, which can be sent out by the terminal 301, and the transmission values sent out to the main base station 101 and the sub-base station 201.

For example, it sets the ratio of power to send out to the main base station 101 and the sub-base station 201 as 3:1, 2:2, and 1:3.

As another example, when power to be sent is distributed, first, it is very important to maintain connectivity with the main base station 101 or transmit a control signal, so, in order to transmit the signal, power may be allocated to the main base station 101 first and then the remaining power may be distributed for data transmission/reception with the sub-base station 201.

As another example, the power available for transmitting data to the sub-base station 201 may be dynamically changed. That is, an MCS (Modulation and Coding Scheme) value may depend on the available power, even if the wireless channel does not change.

A data transmission error may be generated, when the power distribution and the MCS value are simultaneously changed, so that a change of the power distribution and a change of the MCS value may not be simultaneously performed.

Alternatively, when the power distribution and the MCS value are simultaneously changed, a period of reporting a CQI (Channel Quality Indicator) for changing the MCS, which is a feedback signal system, may be set not to be generated simultaneously with the change of the power distribution, in order to prevent a data transmission error.

On the other hand, at least any one of the maximum value of a terminal, the ratio of power that is being used, the maximum transmission power for each base station according to a power ratio, and the margin of the maximum power, which can be transmitted to the base stations, to the power currently sent out to the terminal can be reported to the main base station 101 and the sub-base station 201.

Figure 6:
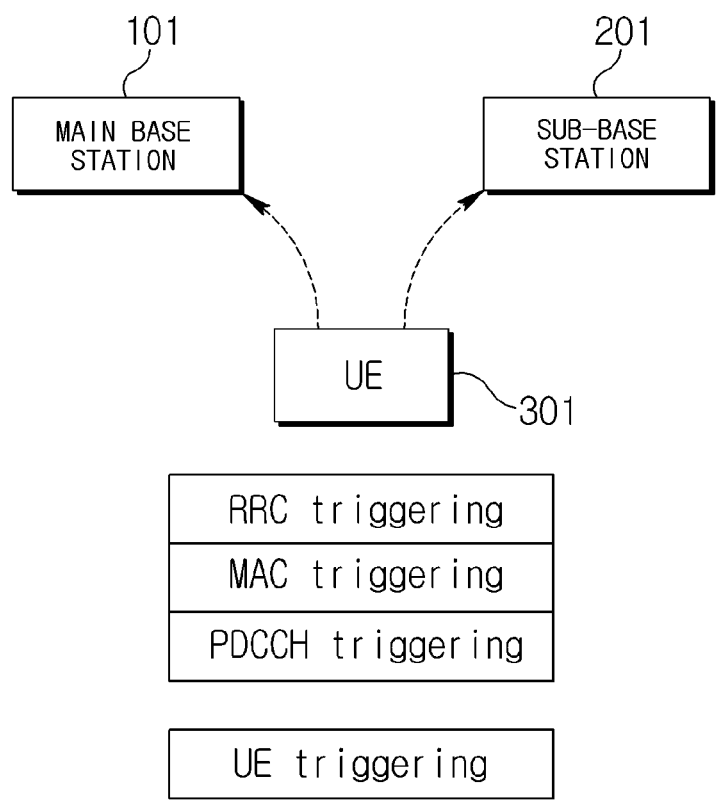
FIG. 6 is a diagram illustrating a configuration in detail when a terminal randomly accesses the main base station or the sub-base station of FIGS. 2 and 3.

FIG. 6 is a diagram illustrating a configuration in detail when the terminal 301 randomly accesses the main base station 101 or the sub-base station 201 of FIGS. 2 and 3.

That is, the system for scheduling in LTE machine type communication includes the main base station 101 that allocates a radio resource to the terminal 301 and performs data communication with the terminal 301, the sub-base station 201 that performs data communication with the terminal 301 simultaneously with the main base station 101, and the terminal 301 that sends out any one of random access to the main base station 101 and the sub-base station 201 by triggering and self random access to them without triggering to at least any one of the main base station 101 and the sub-base station 201.

The triggering is performed by any one triggering command of PDCCH, MAC, and RRC and the sub-base station 201 includes a base station, which can be accessed first, of base stations that can operate as the sub-base station 201.

The random access is transmitted in any one type of a preamble without contents, initial access, a radio resource control message, and a terminal ID.

That is, the random access, which is used for initial access to the main base station 101 or the sub-base station 201, establishment and re-establishment of radio resource control, and handover, may be sent out to any one of the main base station 101 and the sub-base station 201 or simultaneously to the main base station 101 or the sub-base station 201.

Random access may be sent out by PDCCH, MAC, and RRC (Radio Resource Control) triggering from the main base station 101 or the sub-base station 201, but it may be sent out by triggering of a terminal itself.

Further, random access may be sent out by using the remaining power except for the power distributed to an uplink.

On the other hand, when the main base station 101 or the sub-base station 201 is newly turned on, an error may be generated in data communication due to simultaneous random access of surrounding terminals, including the terminal 301.

Accordingly, in order to reduce such influence, the terminal 301 may perform random access, additionally using a random time around ten seconds, when the main base station 101 or the sub-base station 201 is newly turned on. The 'ten seconds' is the maximum random access time that is variable in accordance with the number of terminals and the number of base stations and the maximum random access time may be any one in the range of one second to sixty seconds, depending on the environment.

Meanwhile, since the terminal 301 can use a multi-antenna, it is possible to minimize interference influence by finding the transmission position of the main base station 101 or the sub-base station 201 and performing random access toward the main base station 101 or the sub-base station 201.

Alternatively, when the exact positions of the main base station 101 and the sub-base station 201 are not found, the terminal 301 may perform random access by sweeping at 360 degrees.

FIG. 7 is a diagram illustrating the configuration of LTE machine type communication according to another exemplary embodiment of the present invention.

When the third terminal 130 and the first base station 310 shown in FIG. 1 are operated as a machine type communication module 100 and a base station 200, respectively, in machine type communication, the machine type communication module 100 communicates with the base station 200 through a command-response, an exception report, and a periodic report.

The command-response is information provided from the machine type communication module 100 in response to a command by the base station 200, in which the command is made within 20 bytes, and the response is made within 100 bytes and within ten seconds.

The exception report is a report of information within 100 bytes provided from the machine type communication module 100 to the base station 200 within three to five seconds, when an event occurs, and the periodic report is a report of information provided within 100 bytes with predetermined intervals.

The machine type communication may transmit data not over 1,000 bytes, using one antenna, and may be made within a bandwidth of 1.4 MHz.

The machine type communication module 100 may use 25,344 bits for soft buffer for communication with the base station 200 and may activate an RF circuit, using one oscillator.

FIG. 8 is a diagram illustrating the configuration of an apparatus for scheduling in LTE machine type communication according to the present invention. The apparatus for scheduling in LTE machine type communication includes a base station 200 and a machine type communication module 100 that performs machine type communication.

The machine type communication module 100 may include a transmitter 113 that transmits data to the base station 200, a receiver 123 that receives data from the base station 200, an antenna 143 that is matched with the base station 200 at an RF, and a switch 133 that switches and connects the transmitter 113 and the receiver 123 with the antenna 143.

The machine type communication module 100 may intermittently receive data from the base station 200 by operating in a sleep mode.

That is, the transmitter 113 and the receiver 123 of the machine type communication module 100 operate in the sleep mode and transmit/receive data to/from the base station 200 only for a predetermined time.

When the machine type communication module 100 receives data and then responds to a request for its internal information, it transmits data by operating the transmitter 113.

Figure 9:
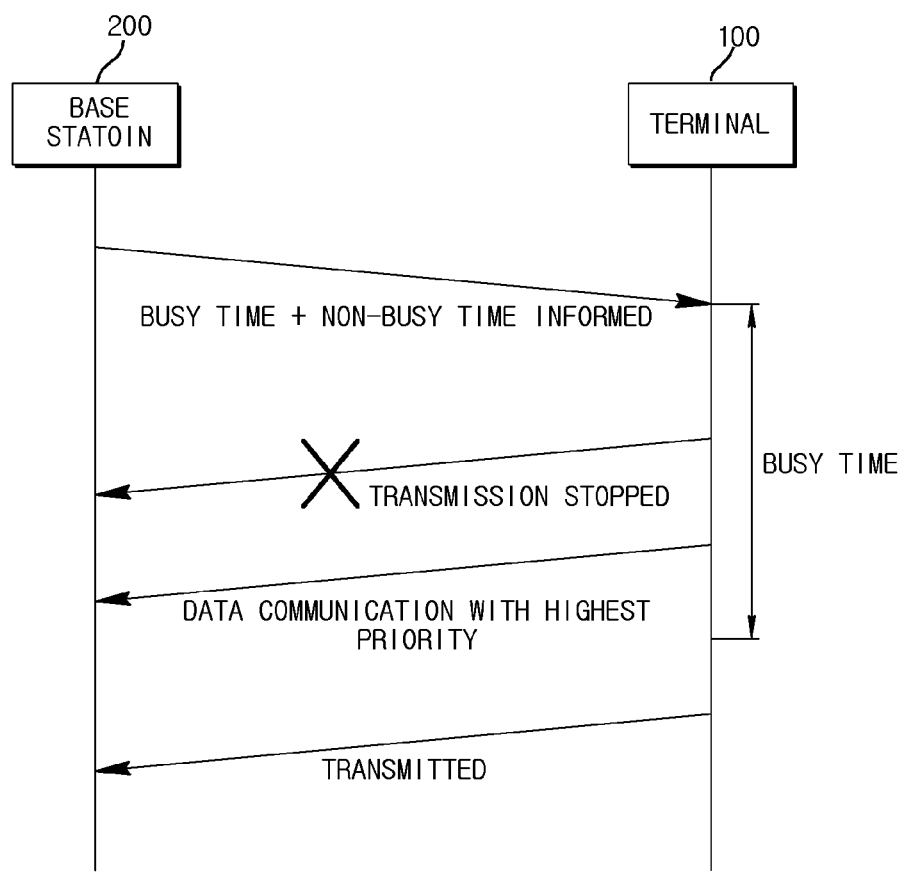
FIG. 9 is a timing diagram illustrating in detail a method of transmitting/receiving data at a busy time between a base station and the machine type communication module of FIG. 7.

FIG. 9 is a timing diagram illustrating in detail a method of transmitting/receiving data at a busy time between a base station 200 and the machine type communication module 100 of FIG. 7.

The machine type communication module 100 can transmit/receive data, avoiding a busy time of the base station 200.

Further, when the machine type communication module 100 receives a message saying a busy time by scheduling of the base station 200, it stops transmission, and when the busy time passes, it can retransmit a message.

The machine type communication module 100 may transmit a report about an event even at the busy time of the base station, depending on the importance.

The machine type communication module 100 may include a transmitter 113 that transmits data to the base station 200, a receiver 123 that receives data from the base station 200, an antenna 143 that is matched with the base station 200 at an RF, and a switch 133 that switches and connects the transmitter 113 and the receiver 123 with the antenna 143. When the machine type communication module 100 receives a message saying a busy time by scheduling of the base station 200, it stops transmission, and when the busy time passes, it can retransmit a message.

According to an embodiment, when terminals over a predetermined number are connected or a predetermined amount of or more data keeps being used, the base station 200 can inform the machine type communication module 100 that it is the busy time. Further, according to an embodiment, the base station 200 can collect statistic information of a time zone in which terminals are connected for a predetermined period (for example, everyday, two days, or a week), can determine specific time zones, in which terminals frequently connect with it, as busy times, and can update the busy times by periodically collecting statistic information.

Further, according to an embodiment, the base station 200 can inform the machine type communication module 100 of busy time information updated or determined through a PBCH, a PMCH, and a PDCCH and transmit a message saying that the busy time has passed or a message saying an expected time when the busy time will pass, to the machine type communication module 100. For example, the base station 200 may stops a machine type communication module 100, which makes a report to the base station 200, from stopping transmission by informing the machine type communication module 100 that it is the busy time through the PDCCH. Further, the base station 200 may inform a machine type communication module 100 that is standing by of a busy time and an expected non-busy time through the PBCH or the PMCH and the machine type communication module 100 may restart communication after the busy time passes by checking the information.

Further, according to an embodiment, when the machine type communication module 100 receives information of a busy time through the PDCCH, the base station 200 may perform scheduling so that communication is kept until the machine type communication module 100 finishes reporting, in order to complete the communication that is being performed.

Further, the base station 200 may inform the machine type communication module 100 of the busy time and the expected non-busy time through a PCFICH, a PHICH, and a PDSCH, other than the PDCCH, PBCH, PMCH.

The busy time may pass, when a message saying that the busy time passes is received by scheduling of the base station 200. Further, by transmitting a message saying the busy time, the base station informs the machine type communication module of the time when the busy time is expected to pass.

Further, according to an embodiment, the base station 200 may give a priority to the machine type communication module 100 and may allow for communication of a machine type communication module 100, which requests urgency, even for the busy time, depending on the priority. For example, a machine type communication module 100 with a low priority in accordance with priority may be set to perform communication at dawn with a cheap data charge, a machine type communication module 100 with a non-low priority may be set to perform communication, avoiding the busy time, and a machine type communication module 100 with the highest priority may be set to perform communication even for the busy time.

According to an embodiment, a report of an event may be transmitted even for the busy time of the base station, depending on the importance.

Therefore, the machine type communication module 100 can save a battery by intermittently operating, can efficiently use the radio resource of the base station 200 without interference by stopping transmission for the busy time of the base station 200, and can secure reliability by transmitting important data in real time by transmitting it even for the busy time, depending on the importance of the data.

Figure 10:
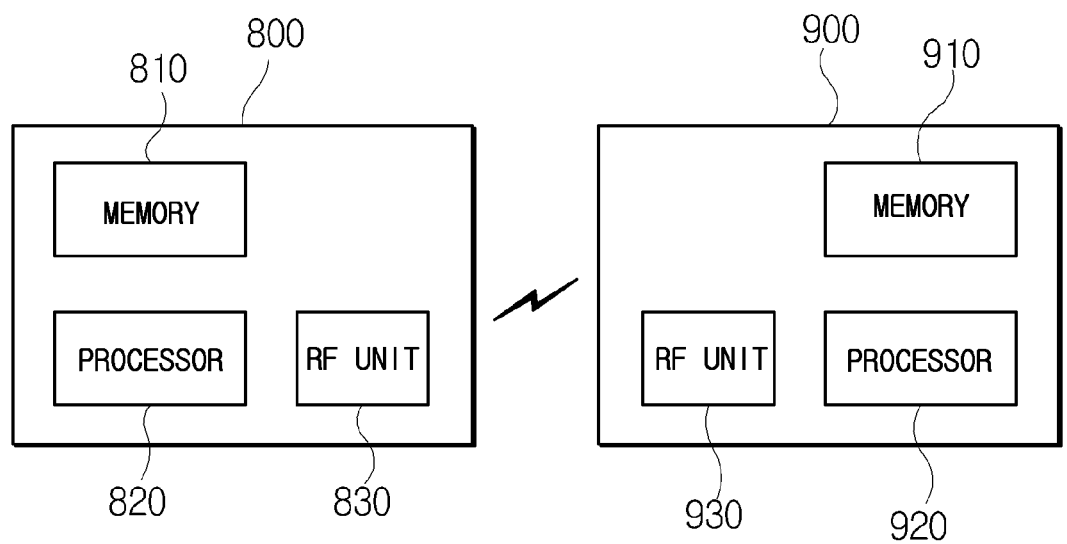
FIG. 10 is a block diagram illustrating a wireless communication system for which exemplary embodiments of the present invention can be achieved.

FIG. 10 is a block diagram illustrating a wireless communication system for which exemplary embodiments of the present invention can be achieved. The wireless communication system shown in FIG. 10 may include at least one base station 800 and at least one terminal 900. A machine type communication module 100 may be considered as a kind of terminal 900 and a base station 200 that communicates with the machine type communication module 100 may also be considered as a base station 800 of the wireless communication system.

The base station 800 may include a memory 810, a processor 820, and an RF unit 830. The memory 810 is connected with the processor 820 and can keep commands and various terms of information for activating the processor 820. The RF unit 830 is connected with the processor 820 and can transmit/receive wireless signals to/from an external entity. The processor 820 can execute the operations of the base stations in the embodiments described above. In detail, the operations of the base stations 100, 101, and 201 etc. in the embodiments described above may be achieved by the processor 820.

The terminal 900 may include a memory 910, a processor 920, and an RF unit 930. The memory 910 is connected with the processor 920 and can keep commands and various terms of information for activating the processor 920. The RF unit 930 is connected with the processor 920 and can transmit/receive wireless signals to/from an external entity. The processor 920 can execute the operations of the terminals in the embodiments described above. In detail, the operations of the terminals 200, 300, 301, and 400 etc. in the embodiments described above may be achieved by the processor 920.

The present invention may be modified in various ways and implemented by various exemplary embodiments, so that specific exemplary embodiments are shown in the drawings and will be described in detail.

However, it is to be understood that the present invention is not limited to the specific exemplary embodiments, but includes all modifications, equivalents, and substitutions included in the spirit and the scope of the present invention.

Terms used in the specification, 'first', 'second', etc., may be used to describe various components, but the components are not to be construed as being limited to the terms. The terms are used to distinguish one component from another component. For example, the 'first' component may be named the 'second' component, and vice versa, without departing from the scope of the present invention. The term 'and/or' includes a combination of a plurality of items or any one of a plurality of terms.

It should be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween.

Terms used in the present specification are used only in order to describe specific exemplary embodiments rather than limiting the present invention. Singular forms are intended to include plural forms unless the context clearly indicates otherwise. It will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Unless indicated otherwise, it is to be understood that all the terms used in the specification including technical and scientific terms has the same meaning as those that are understood by those skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present invention will be described in more detail with reference to the accompanying drawings. In order to facilitate the general understanding of the present invention in describing the present invention, through the accompanying drawings, the same reference numerals will be used to describe the same components and an overlapped description of the same components will be omitted.

In one or more exemplary embodiments, the described functions may be achieved by hardware, software, firmware, or combinations of them. If achieved by software, the functions can be kept or transmitted as one or more orders or codes in a computer-readable medium. The computer-readable medium includes all of communication media and computer storage media including predetermined medial facilitating transmission of computer programs from one place to another place.

If achieved by hardware, the functions may be achieved in one or more ASICs, DSPs, DSPDs, PLDs, FPGAs, processors, controllers, microcontrollers, microprocessors, other electronic units designed to perform the functions, or combinations of them.

If achieved by software, the functions may be achieved by software codes. The software codes may be kept in memory units and executed by processors. The memory units may be achieved in processors or outside processors, in which the memory units may be connected to processors to be able to communicate by various means known in the art.

Although the present invention was described above with reference to exemplary embodiments, it should be understood that the present invention may be changed and modified in various ways by those skilled in the art, without departing from the spirit and scope of the present invention described in claims.

What is claimed is:

1. An apparatus of scheduling in machine type communication, the apparatus comprising a machine type communication module that performs machine type communication with a base station,
    the machine type communication module comprising:
    a transmitter configured to transmit data to the base station;
    a receiver configured to receive data from the base station;
    an antenna configured to match with the base station at an RF; and
    a switch configured to switch and connect the transmitter and the receiver with the antenna,
    wherein when the receiver of the machine type communication module receives from the base station a message indicating information on a busy time, the machine type communication module is configured to stop transmitting or transmit the data based on the information on the busy time, and
    wherein the busy time is information of scheduling which the base station has determined based on at least one of (i) whether the number of terminals is more connected to the base station than a predetermined number of terminals, (ii) whether the data keep being used more than a predetermined amount of data, and (iii) whether the terminals are connected for a predetermined time period.

2. The apparatus of claim 1, wherein the machine type communication module intermittently receives data from the base station by operating in a sleep mode.

3. The apparatus of claim 1, wherein the machine type communication module is configured to transmit and/or receive data, based on the information of the busy time to avoid transmitting the data to the base station for a period of the busy time.

4. The apparatus of claim 1, wherein the machine type communication module is configured to stop transmitting the data when the received message indicates a busy time for transmission, and the machine type communication module is configured to retransmit the data when the received message indicates that the time period of the busy time for transmission has passed.

5. The apparatus of claim 1, wherein the machine type communication module is configured to transmit a report of an event even at the busy time of the base station, depending on the importance of the report.

6. The apparatus of claim 1, wherein the machine type communication module is configured to transmit the information on the busy time to the base station to thereby collect and update the information on the busy time.

* * * * *